Figure 1:
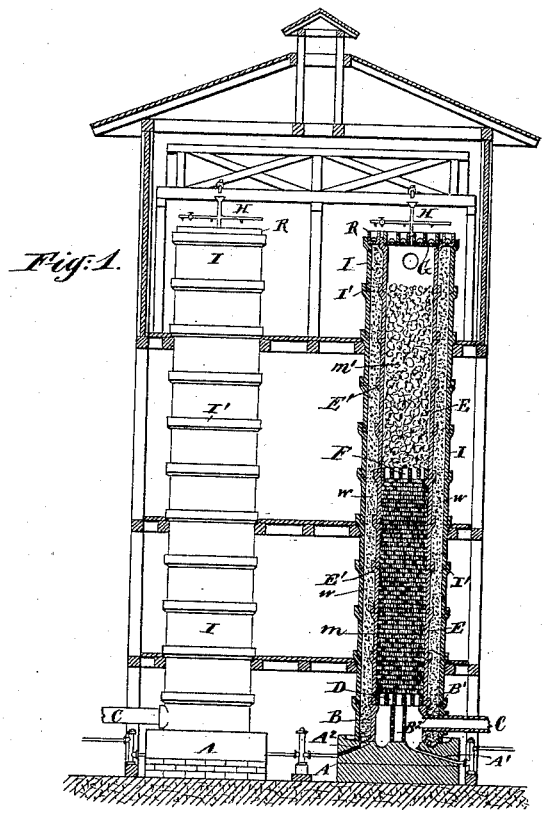

(No Model.)

C. GRAHAM.
TOWER FOR CONDENSING ACID.

No. 436,414. Patented Sept. 16, 1890.

Witnesses:
Charles R. Searle
H. A. Johnstone

Inventor:
Charles Graham
by his attorney
Thomas Drew Stetson

United States Patent Office.

CHARLES GRAHAM, OF BROOKLYN, NEW YORK.

TOWER FOR CONDENSING ACID.

SPECIFICATION forming part of Letters Patent No. 436,414, dated September 16, 1890.

Application filed January 15, 1889. Serial No. 296,414. (No model.)

*To all whom it may concern:*

Be it known that I, CHARLES GRAHAM, of Brooklyn, in the county of Kings and State of New York, have invented a certain new and useful Improvement Relating to Means for Condensing Acid, of which the following is a specification.

It has long been practiced in the manufacture of hydrochloric acid to conduct the fumes produced by the decomposition of chloride of sodium (common sea-salt) upward through a tower in which it is presented to water trickling slowly down over material which causes it to present a very extended surface. Coke is largely used as such material, and I use the term "stoneware tower" to designate this apparatus, whatever may be the material employed in the interior of the tower proper.

My invention is intended to overcome a difficulty heretofore very serious in connection with the use of such towers. It is difficult to find any material except burnt clay (earthenware) joined by a cement of tar and clay, which can endure the conditions. It is found preferable to make the towers some twenty to fifty feet high. The material is made in lengths and socketed together and supported at short intervals by external means. With all the precautions it is difficult to avoid the cracking and other failure of the earthen pipes at short intervals and much acid is worse than lost by causing destruction to surrounding objects.

I make an interior tower, which may be in all respects like the best ordinary tower, giving it, for example, a diameter of thirty inches and a height of thirty feet, the tower being made in uniform lengths of about two feet and matched together by socketing, like water-pipes. This tower is inclosed within another larger one, there being some six inches space between the exterior of the inner and main tower and the interior of the outer and secondary tower. This outer tower, like the innermost, is of earthenware, made in lengths and socketed together; but I make the joints and the whole material of the outer tower as tight as may be. The innermost tower is filled with coarse material—large crockery dishes or large lumps of coke, or the two properly arranged in layers. The water is admitted at the top and trickles down over these surfaces, performing its ordinary functions, and so long as there is no failure of this tower the operation proceeds in the ordinary manner, and under such conditions the exterior tower and the material between the innermost and the outermost is of little or no effect except to protect the innermost tower from changes of temperature and to mechanically support the innermost, the outermost being supported by the timbers of the framing which surrounds it. The space between the outermost and the innermost is filled with finely-broken coke, and a small quantity of water is allowed to trickle down constantly through the interstices and keep the large surface thereby presented thoroughly wet. This water escapes at the bottom and is inspected at short intervals. Under ordinary conditions when the tower is new this water slowly escaping from the bottom of the intermediate space is so slightly impregnated with the acid as to be of no value and is allowed to run to waste; but so soon as a failure of the inner main tower at any point occurs, and the acid either in the form of gas or liquid leaks outward from the inner tower, it is caught and spread over the extended surfaces presented by the fine coke in the annular space, and when it is in the gaseous form it is there condensed. When this arrives at the bottom, the existence of a fracture or leak becomes known, and steps may be taken at any subsequent period to repair the mischief; but my method and apparatus render it unnecessary to hasten such repairs. Until a leakage becomes very great all the acid escaping is condensed by the moist surfaces presented in the annular space. The water discharged under such conditions at the bottom of the annular space being sufficiently acid to be valuable is preserved either by being mingled with the water which percolates down the interior of the main tower or by being conducted to a separate tank provided for weaker acid. Ordinarily in this manufacture a provision is made by valves or by movable spouts for changing the flow of the acid into two or more different tanks, the acid being strongest during the first portion of the treatment of a charge of salt in retort (not shown) and becoming weaker as the treatment proceeds. The dilute acid from the annular space may be conducted into the tank having the first, second, or third strength, or allowed to flow to waste as it shall be found expedient.

The accompanying drawings form a part of this specification and represent what I consider the best means of carrying out the invention.

Figure 3:
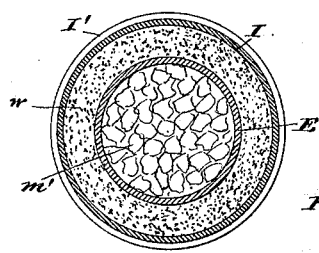
Figure 2:
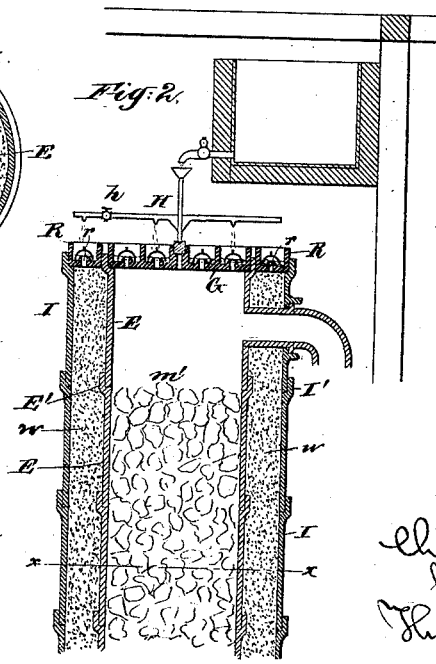
Figure 4:
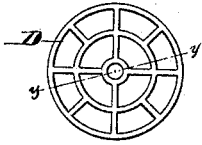
Figure 5:

Figure 1 is a vertical section through the entire apparatus, representing the supporting-framing and other parts in elevation. The remaining figures are on a larger scale. Fig. 2 is a central vertical section of the upper portion of my tower. Fig. 3 is a horizontal section on the line $xx$ in Fig. 2. Fig. 4 is a plan view of the bottom grate. Fig. 5 is a section of the same on the line $yy$.

Similar letters of reference indicate corresponding parts in all the figures where they occur.

A is the ordinary foundation-stone having the ordinary gutter and discharge-passage.

B is a stout bottom piece of earthenware, having an aperture B′, which receives the fumes through a pipe C from a retort. (Not represented.)

$B^2$ is a perforated central pipe, which aids to support the earthenware grating D, which holds up the open-piled bricks or other suitable coarse material $m$ in the lower part of the main tower.

The main tower is made of earthenware lengths E, applied together, as shown. The upper end of each is formed with a bell, enlargement, or socket E′, which receives the lower portion of the next in the same manner as has long been practiced in joining water-pipes. An additional earthenware grate F, placed at a proper height in the main tower, supports the coke $m'$ in the upper part of the main portion. The top of the main tower is closed by any ordinary or suitable cover G. Provisions, which may be the ordinary revolving distributer H, supply water to percolate down over the extended surfaces of the material $m\ m'$ and be discharged at the bottom through the channel A′, and thence conducted to any desired reservoirs. (Not shown.) While the apparatus is in the best condition, the water thus descending in the main or inner tower absorbs practically all the acid. The fumes are received through the pipe C and rise through the liberal spaces between the coarse masses of material $m\ m'$, while the gases escape from the top in the ordinary way.

My external casing is made of lengths I of earthenware, joined by sockets or bells I′.

The annular space between the two towers is filled with finely-broken coke $w$. Provision is made by an annular top R, with "water-luted" or trapped perforations $r$, for sprinkling water which is received from the revolving distributer H, controlled by cocks $h$, in a regulated supply to percolate down between the casings E and I and keep the fine filling $w$ constantly wet. This water escapes at the bottom through a channel $A^2$, and may be led away to any desired points. Frequent examinations must be made by the attendants, and so soon as this water, in consequence of any leakage of the internal tower, comes down so much impregnated with acid as to make it worth preserving it is directed into a corresponding tank.

In the cover G the deep webs on the upper surface perform the functions simply of dams to hold the water for the several holes and insure that a proper quantity, the same as is received in that compartment from the revolving distributer H, is in due time transmitted downward through the luted or trapped openings and supplied to the coke $m'$, lying under it. My lower grate D is formed with corresponding deep webs. It differs from the cover G mainly in the fact that the entire spaces between the deep vertical webs are cut quite through and form liberal apertures, through which the fumes may rise and the acidulated water may descend. The depth of the webs in this lower grate D gives it great strength to support the incumbent load of filling $m'$.

No grate is necessary to support the fine filling $w$ in the intermediate space between E· and I; but it is sufficient to charge the lower part of this space with coarse coke or broken stoneware, making it gradually finer for a depth of ten or twenty inches. Above this it may be uniformly fine to the top. The coarse at the bottom holds up the finer and affords clear spaces in its considerable interstices, through which the acid will flow around in the annular channel in the stone A and be led away through the passage $A^2$.

Modifications may be made in the details without departing from the principle or sacrificing the advantages of the invention.

The filling $w$ for the annular space may be finer than described, and may even be mixed with tar, so as to partially obstruct the movement of the water. The same character which makes it impervious to water will also make it impervious to gas.

I prefer to construct the tower in lengths of earthenware tubes E E′ and I I′, as above described; but the same end may be attained by building one or both towers of other material—as of brick or tile—with the seams properly secured by tar, clay, or the like, and the whole strongly tied together. It is sufficient if the towers are made of material having proper strength and of a character able to withstand the chemical action of the acid.

The foundation A, instead of being stone, may be a substantial pan of stout earthenware.

I claim as my invention—

1. In apparatus for condensing acid, in combination with the internal lengths E E′ and the coarse fillings $m\ m'$ and external lengths I I′, with intermediate fine filling $w$, the means H R $r$, for supplying water to percolate down therein, arranged to serve as herein specified.

2. The hollow towers, one arranged concentrically within the other, the innermost having a coarse filling and the intermediate space a finer filling, both fillings being kept wet, with provisions $h$ for adjusting the supply of water to the intermediate filling, in combination with each other and with provisions for conducting away the water from the intermediate space through a separate passage $A^2$, all substantially as herein specified.

3. The bottom grate D, formed with deep webs arranged concentrically and radially, with the spaces between open, in combination with the bottom piece B, perforated central support $B^2$, and with two towers, one within the other, with suitable filling between, all arranged to serve substantially as herein specified.

In testimony whereof I have hereunto set my hand, at New York city, this 11th day of January, 1889, in the presence of two subscribing witnesses.

CHAS. GRAHAM.

Witnesses:
THOMAS DREW STETSON,
H. A. JOHNSTON.